(No Model.)

M. R. JENKINS.
HAY STACKER AND LOADER.

No. 514,715. Patented Feb. 13, 1894.

WITNESSES

INVENTOR
M. R. Jenkins
by E. W. Anderson
his Attorney

United States Patent Office.

MARION R. JENKINS, OF BROWNING, MISSOURI.

HAY STACKER AND LOADER.

SPECIFICATION forming part of Letters Patent No. 514,715, dated February 13, 1894.

Application filed June 30, 1893. Serial No. 479,285. (No model.)

*To all whom it may concern:*

Be it known that I, MARION R. JENKINS, a citizen of the United States, and a resident of Browning, in the county of Linn and State of Missouri, have invented certain new and useful Improvements in Hay Stackers and Loaders; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
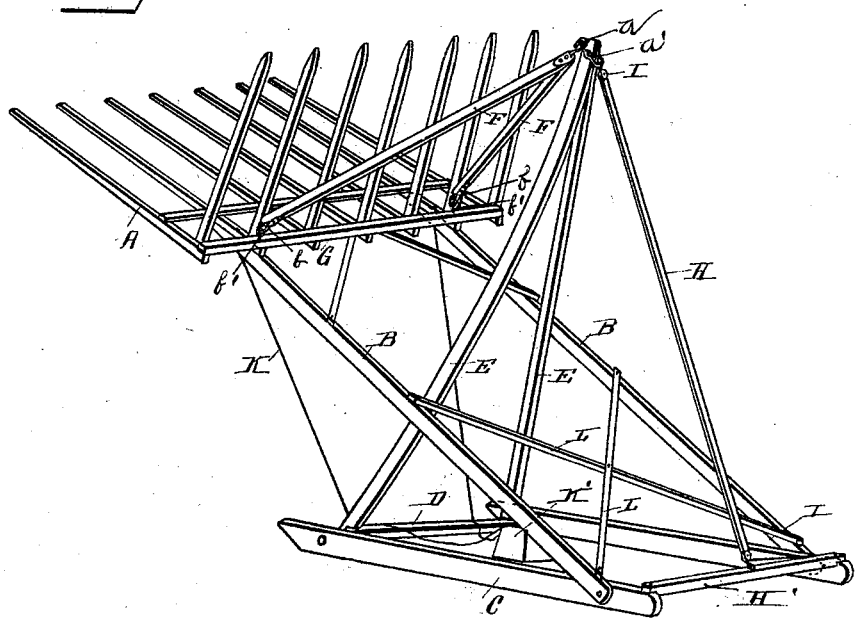
Figure 2:
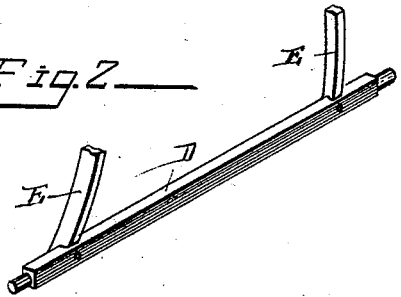

Figure 1 of the drawings is a representation of the invention and is a perspective view and Fig. 2 is a detail view.

This invention has relation to certain new and useful improvements in hay stackers and loaders, and has for its object the provision of a machine of this character, simple in construction, effective in operation, and strong and durable; and the invention consists in the novel construction and combination of parts, all as hereinafter described and pointed out in the appended claims.

Referring to the accompanying drawings, the letter A designates a horse hay fork of the usual construction, and which is carried by a pair of parallel bars B, B, pivoted at their rear end portions to the rear lateral portions of a sled runner frame C. The lateral bars of said frame are connected to each other at their forward portions by means of a transverse rock bar D which has bearings at its ends in said frame bars. Rigidly connected to said rock bar D, one near each side of the frame are two bars or levers E, E, which are joined at their upper portions. Connecting the joined portions of said bars or levers E, E, with the rear bar G of the fork A, are two bars F, F, joined together at their upper ends and connected to the joined portions of the bars or levers E, E, by means of an eye-bolt *a* which loosely engages an eye or staple *a'*. Said bars diverge as they extend downwardly and forwardly, so that they join the fork one near each side portion thereof, being loosely connected to the bar G by means of eyes *b* engaging staples *b'*.

The power is applied by means of ropes H and pulleys I carried by the upper ends of the bars or levers E, E, and by the rear cross bar H' of the frame C.

When power is applied to the end of the rope I, the bars or levers E, E, are rocked with the bar D, and through the bars F, F, raise the bars B, B, and the fork carried thereby into discharging position. Said bars F, F, are superior to a flexible connection between the fork and levers E, E, for the reason that they do not permit the fork to careen when loaded heavier at one side than at the other. This is an important feature inasmuch as it is impossible to gather the hay evenly onto the fork, and an operator has usually been required to even up the hay on the said fork. This service I dispense with as the fork cannot careen however loaded.

It will be observed that the bars E, E, are connected to the base frame very near the extreme forward end thereof, whereby said bars may be of much greater length and capable of a greater swing without interfering with the stack.

K designates the stop rope which is attached to the fork, and to a weight K', or other suitable object. By adjusting this rope, the load may be discharged on the center of the stack at all times.

L, L, are braces for the bars or levers B B.

The machine as above described is extremely simple in its construction, is inexpensive, and is very strong and durable, the arrangement of the parts being such as to cause the strain to come lengthwise upon every piece. It may be taken apart or put up in a very short time, or may be moved from place to place with ease.

Having thus described my invention, what I claim as new, and desire to secure by Letters Patent, is—

1. In a hay stacking and loading machine, the combination with the fork, and the bars B, B, which carry said fork, of the frame C to which said bars are pivotally connected at their rear portions, the bars or levers E, E, having a rocking connection with the forward portion of said frame, the arms F, F, connected to the upper portions of said bars or levers, and to the fork, and means for elevating said bars or levers and thereby the fork, substantially as specified.

2. In a hay stacking and loading machine, the combination with the sled runner frame C, the rock-bar connecting the forward lateral portions of said frame, and capable of a rocking movement therein, the bars or levers E, E, secured at their lower ends to said bar or roller, and joined at their upper portions, the bars B, B, pivoted at their rear portions to the rear lateral portions of the said frame, the fork secured to the forward portions of said bars, and the arms F, F, loosely connected at their upper ends to the upper portions of the bars or levers E, E, and at the lower ends of the fork, and means for elevating said bars or levers and the fork, substantially as specified.

In testimony whereof I affix my signature in presence of two witnesses.

MARION R. JENKINS.

Witnesses:
BENJ. HOLDING,
J. T. FLEMING.